United States Patent
Raistrick

(10) Patent No.: US 7,367,502 B2
(45) Date of Patent: May 6, 2008

(54) DELIVERY OF ITEM SPECIFIC AUDIBLE INFORMATION VIA VOICE SERVER

(75) Inventor: David Raistrick, Bloomington, IL (US)

(73) Assignee: En-Vision America, Inc., Normal, IL (US)

( * ) Notice: Subject to any disclaimer, the term of this patent is extended or adjusted under 35 U.S.C. 154(b) by 259 days.

(21) Appl. No.: 11/225,488

(22) Filed: Sep. 13, 2005

(65) Prior Publication Data

US 2007/0057032 A1   Mar. 15, 2007

(51) Int. Cl.
    *G06K 7/00* (2006.01)
(52) U.S. Cl. .................. 235/436; 235/385; 235/435; 235/462.01
(58) Field of Classification Search ..............
    235/472.01–472.03, 385, 435, 436, 462.01, 235/462.13
    See application file for complete search history.

(56) References Cited

U.S. PATENT DOCUMENTS

| | | | |
|---|---|---|---|
| 5,917,174 | A | 6/1999 | Moore et al. |
| 6,335,928 | B1 | 1/2002 | Herrmann et al. |
| 6,349,132 | B1 | 2/2002 | Wesemann et al. |
| 6,587,822 | B2 | 7/2003 | Brown et al. |
| 6,606,374 | B1 | 8/2003 | Rokoff et al. |
| 6,606,611 | B1 | 8/2003 | Khan |
| 6,772,123 | B2 | 8/2004 | Cooklev et al. |
| 6,792,086 | B1 | 9/2004 | Saylor et al. |
| 6,871,780 | B2 * | 3/2005 | Nygren et al. ............... 235/375 |
| 6,877,658 | B2 | 4/2005 | Raistrick et al. |
| 6,895,084 | B1 | 5/2005 | Saylor et al. |
| 2002/0111869 | A1 * | 8/2002 | Shuster et al. ................ 705/23 |

OTHER PUBLICATIONS

A printout from www.linux.about.com of "VoiceXML: Adding Voice To Your Web Pages", by Juergen Hass; Jun. 25, 2005; Three pages.
A printout of "The Interaction Center Platform", by Dr. Donald E. Brown; Updated May 25, 2005; Thirty-Five pages.
A printout from www.wirelessweek.com titled "Need An Answer? Just Ask", by Brad Smith; Dated Jun. 26, 2000; One page.
A printout of ST's MPEG 2.5 Layer III Audio Decoder featuring STA013; STA013B; and STA013T; Feb. 2004; Thirty-Eight pages.
A printout from www.talkingsigns.com of "Talking Signs: Remote Infrared Sign Systems"; Five pages; Revised Jun. 10, 2005.
A printout from www.microsoft.com of "Speech Application Language Tags (SALT)"; Four pages; Updated Nov. 18, 2002.

(Continued)

*Primary Examiner*—Seung Ho Lee
(74) *Attorney, Agent, or Firm*—Trexler, Bushnell, Giangiorgi, Blackstone & Marr, Ltd.

(57) ABSTRACT

A device for accurately and flexibly delivering item-specific information from a voice server to a user and the method of using same is disclosed. The user scans a unique identification code associated with an item using a scanner on the device. The device then connects to the voice server. The voice server searches for information related to the item and converts the information for the item into audible information for delivery to the user. The audible information is audibly played to the user by the device.

30 Claims, 6 Drawing Sheets

OTHER PUBLICATIONS

A printout from www.hardware.silicon.com of "Nokia Gets Smart With RFID Kit", by Graeme Wearden; Published Feb. 23, 2005; Four pages.

A printout of FTDI Chip's USB UART I.C.; Twenty-Five pages; Version 1.7; Copyright 2005.

A printout of Motorola's SM56 UbiSurf Software modems; Two pages; Copyright 2005.

A printout of "A Robotic Guide for the Visually Impaired in Indoor Environments", by Vladimir Kulyukin et al.; Four pages; Dated at least as early as Aug. 28, 2005.

A printout from www.walkinginfo.org of "Accessible Pedestrian Signals" featuring talking signs; Three pages; Dated at least as early as Aug. 28, 2005.

A printout from www.hardware.silicon.com of "Nokia Gets Smart With RFID Kit", by Graeme Wearden; Published Feb. 23, 2005; Four pages.

A printout from www.nokia.com of "Nokia Mobile RFID Kit"; One page; Available at least as early as Aug. 1, 2005.

A printout from www.hitcentral.org of "Opening Up the Internet through Voice Portals", by David Boothroyd; Seven pages; Copyright 2001.

\* cited by examiner

DELIVERY OF ITEM SPECIFIC AUDIBLE INFORMATION VIA VOICE SERVER

BACKGROUND OF THE INVENTION

Voice servers, voice gateways and interactive voice response (IVR) have existed for many years. In recent years, the establishment of voice extensible markup language (VoiceXML) and speech application language tags (SALT) allow for web-based applications and information to be distributed via voice to landline telephones, cellular telephones or to other devices. This has allowed the availability of web-centric information by landline telephones, cellular telephones phones, PDA's and personal computers.

Radio frequency identification (RFID) tagging of goods is well-known. The Electronic Product Code™ (EPC) proposed by EPC Global is the next generation of product identification. The EPC is a simple, compact "license plate" that uniquely identifies objects (items, cases, pallets, locations, etc.) in the supply chain. Essentially, the EPC is a number designed to uniquely identify a specific item in the supply chain. The EPC number sits on a tag comprised of a silicon chip and an antenna, which is attached to an item. Using RFID, a tag "communicates" its number to a reader. The reader then passes the number to a computer or local application system, known as the Object Name Service (ONS). ONS tells the computer systems where to locate information on the internet about the object carrying an EPC, such as when the item was produced. EPC's vision is sometimes referred to as the "Internet of Things". EPC leverages the benefits of RFID's non-line-of-sight reading, large data capacity and anti-theft/anti-counterfeiting features. The EPC is the only information stored on the RFID tag's microchip. This keeps the cost of the tag down and provides flexibility, since an infinite amount of dynamic data can be associated with the serial number in the database.

U.S. Pat. No. 6,877,658, entitled Apparatus and Method for Information Challenged Persons to Determine Information Regarding Pharmaceutical Container Labels, provides a system in which combines a tag and a device with text information stored on the tag. This type of system relates to on-board, text-to-speech generation only rather than speech generated by a remote server.

Other patents of interest are U.S. Pat. No. 5,917,174 entitled Device for Assisting the Visually Impaired in Product Recognition and Related Methods; U.S. Pat. No. 6,335,927 entitled Method and Apparatus for Accessing and Interacting an Internet Web Page Using a Telecommunications Device; U.S. Pat. No. 6,349,132 entitled Voice Interface for Electronic Documents; U.S. Pat. No. 6,587,822 entitled Web-Based Voice Response (IVR); U.S. Pat. No. 6,606,374 entitled System and Method for Recording and Playing Audio Descriptions; U.S. Pat. No. 6,606,611 entitled System and Method for Audio-only Internet Browsing Using a Standard Telephone; U.S. Pat. No. 6,772,123 entitled Method and System for Performing Speech Recognition for an Internet Appliance Using a Remotely Located Speech Recognition Application; and U.S. Pat. No. 6,895,084 entitled System and Method for Generating Voice Pages with Included Audio Files for Use in a Voice Page Delivery System.

SUMMARY OF THE INVENTION

Briefly, the present invention discloses a device for accurately and flexibly delivering item-specific information from a voice server to a user and the method of using same. The user scans a unique identification code associated with an item using a scanner on the device. The device then connects to the voice server. The voice server searches for information related to the item and converts the information for the item into audible information for delivery to the user. The audible information is audibly played to the user by the device.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
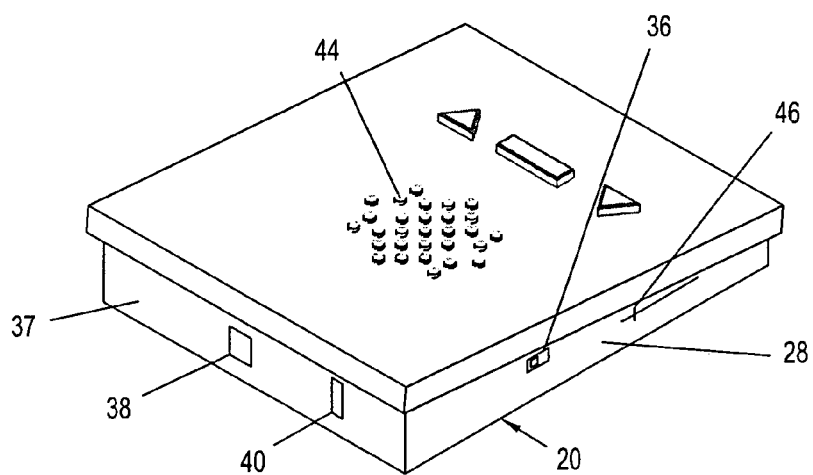
FIG. 1 is a rear perspective view of a device which incorporates the features of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

A device 20 for accurately and flexibly delivering item-specific information from a voice server 24 to a user of the device 20 and the method of using same is provided. The voice server 24 connects to a server 26 on which non-audible information is stored. Non-audible information can be stored on the server 26 in a number of ways, for example, a text file can be sent and stored thereon, a static HTML file can be sent and stored thereon, a voice extensible markup language (VoiceXML) page can be sent and stored thereon. The textual information can be provided on the server 26, for example, as an open database connectivity (ODBC) compliant database or a mySQL database. The voice server 24 and the server 26 are remote from the device 20. The voice server 24 is preferably a text-to-speech (TTS) voice server. The present device 20 has particular usefulness to a visually impaired person, however, the user is not so limited. The voice server 24 can be a separate server than server 26, or the servers 24, 26 can be provided as an integrated system.

The device 20 is a scanning-enabled computing device. The device 20 includes a plurality of walls which form an enclosure 28. Suitable electronics 30, which may take the form of a microprocessor and associated software, or discrete components, are provided within the enclosure 28 for carrying out the functions of the device 20. A memory 32 and a modem 34 are provided within the enclosure 28 and are connected to the electronics 30. An on/off switch 36 is provided on the enclosure 28 and is connected to the electronics 30. The device 20 may be battery-powered or may be directly plugged into an outlet by a suitable power cord (not shown) attached to a jack 37. A telephone jack 38 is provided on one of the walls of the enclosure 28 and is connected to the electronics 30. A telephone line (not shown) can be connected to the device 20 via the telephone jack 38. A USB port 40 is also provided on one of the walls of the enclosure 28 and is connected to the electronics 30. An Internet connection device (not shown) can be connected to the device 20 by a cable which is connected into the USB connection port 40. A wireless connection 41, such as a wireless telephone or a wireless modem, can also be provided within the enclosure 28 and is connected to the electronics 30 and to a telephone or to the Internet connection device. One, two or all three types of connections (the telephone jack 38, the USB connection port 40, or the wireless connection) can be provided on the device 20. Other connections are within the scope of the present invention. A speaker 42 is provided within the enclosure 28 and transmits sound through a speaker interface 44 on one of the walls of the enclosure 28. The speaker 42 is connected to the electronics 30. A volume control 46 is provided on one of the walls of the enclosure 28 and is connected to the electronics 30 to control the volume of the speaker 42. A start button 48 is provided and is connected to the electronics 30. Buttons 50, 52 are provided for allowing a user to select a voice upon start-up from the factory as discussed herein. The buttons 50, 52 are connected to the electronics 30 within the enclosure 28.

Figure 3:
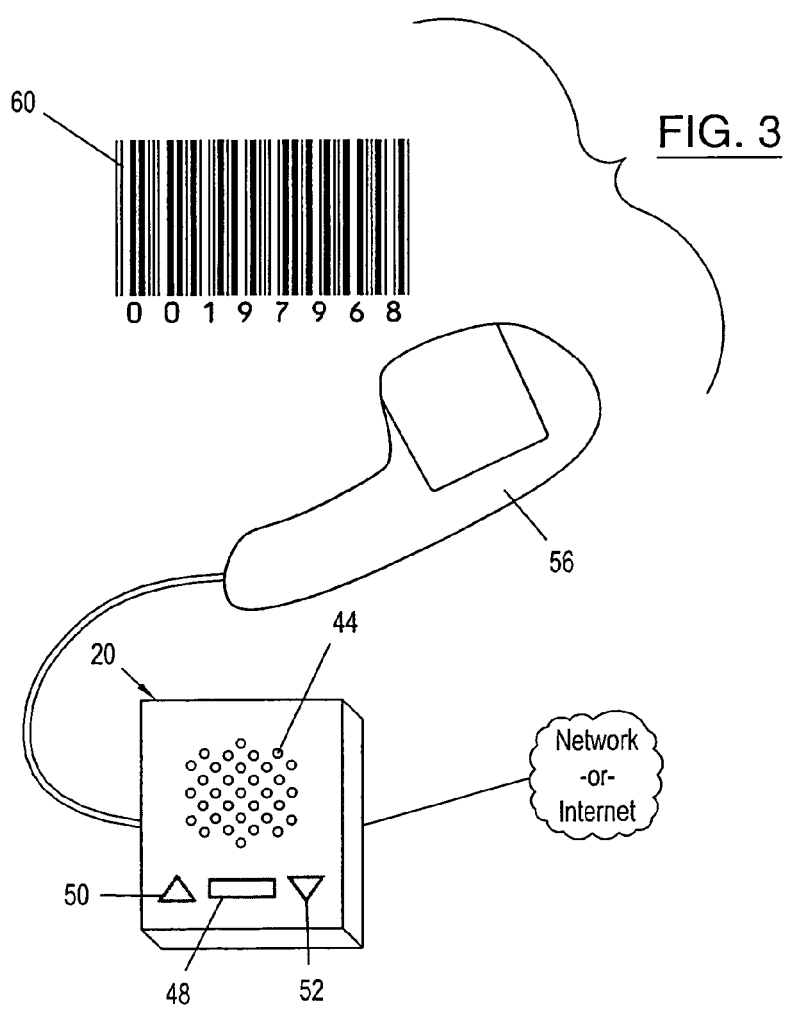
FIG. 3 is a top perspective view of the device attached to a bar code scanner and showing a bar code.
Figure 2:
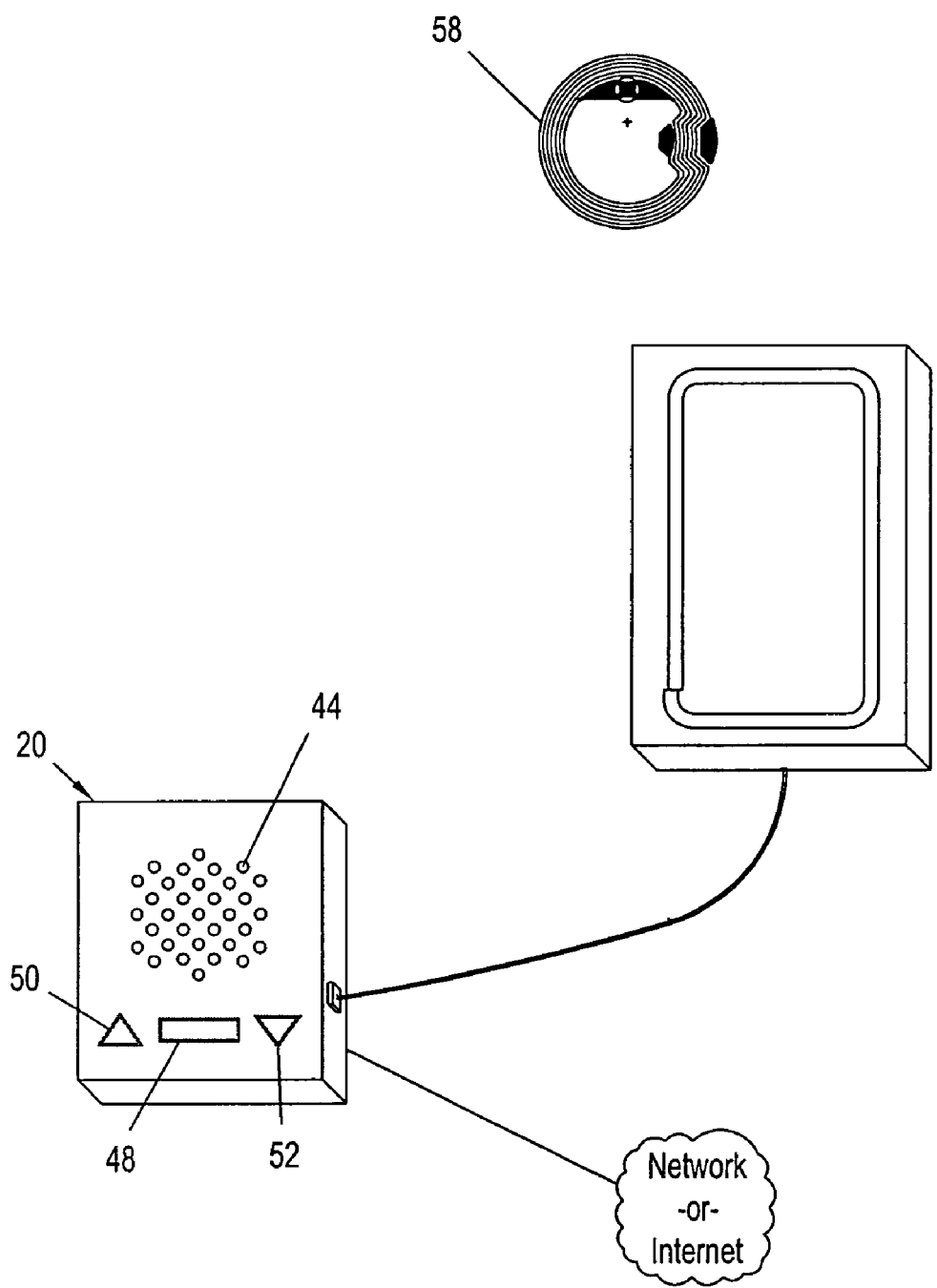
FIG. 2 is a top perspective view of the device attached to a RFID scanner and showing a RFID tag.
Figure 4:
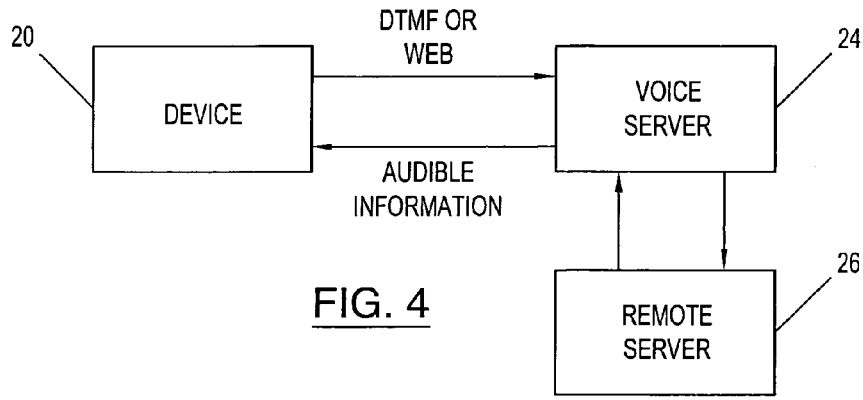
FIG. 4 is a block diagram showing components of a system in which the device is used.
Figure 5:
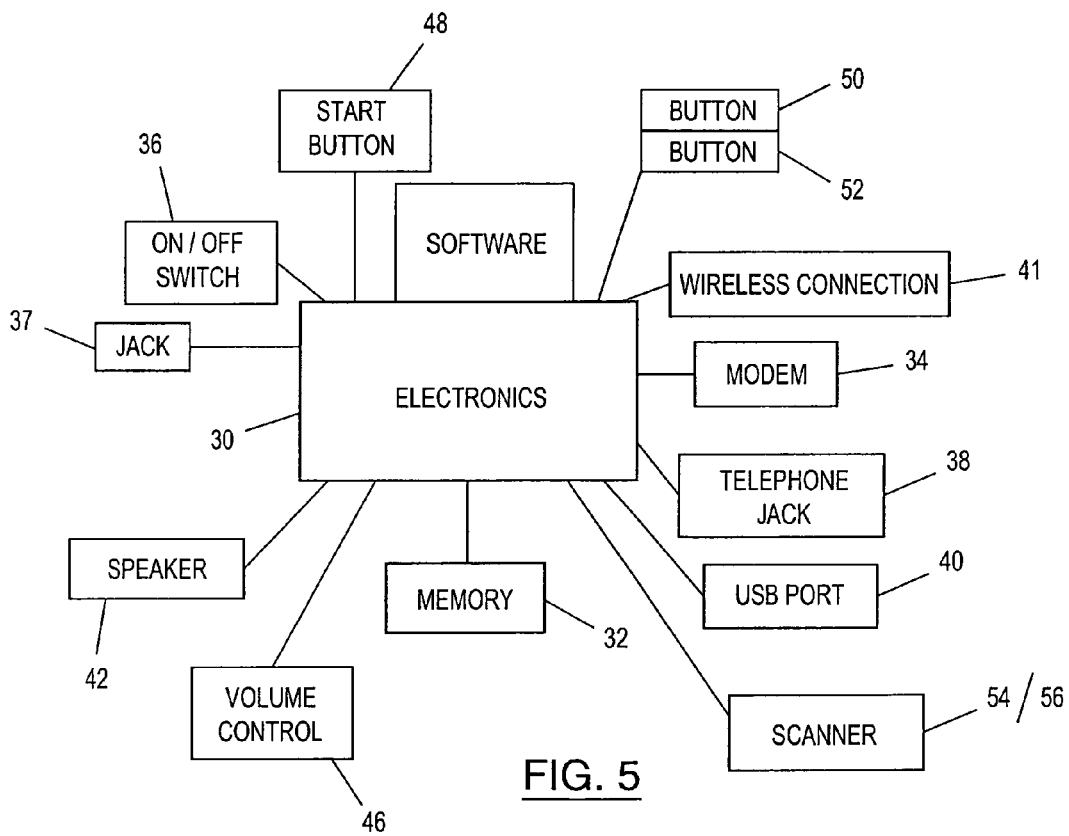
FIG. 5 is a block diagram of some of the components of the device.

By scanning-enabled, this means that the device 20 has an RFID reader/writer 54, see FIG. 2, or bar code scanner 56, see FIG. 3, connected to or integrated into the device 20. The RFID reader/writer 54 or bar code scanner 56 is connected to the electronics 30. The device 20 can be a personal computer; wireless PDA; digital or analog telephone; cell phone; etc.

Figure 8:
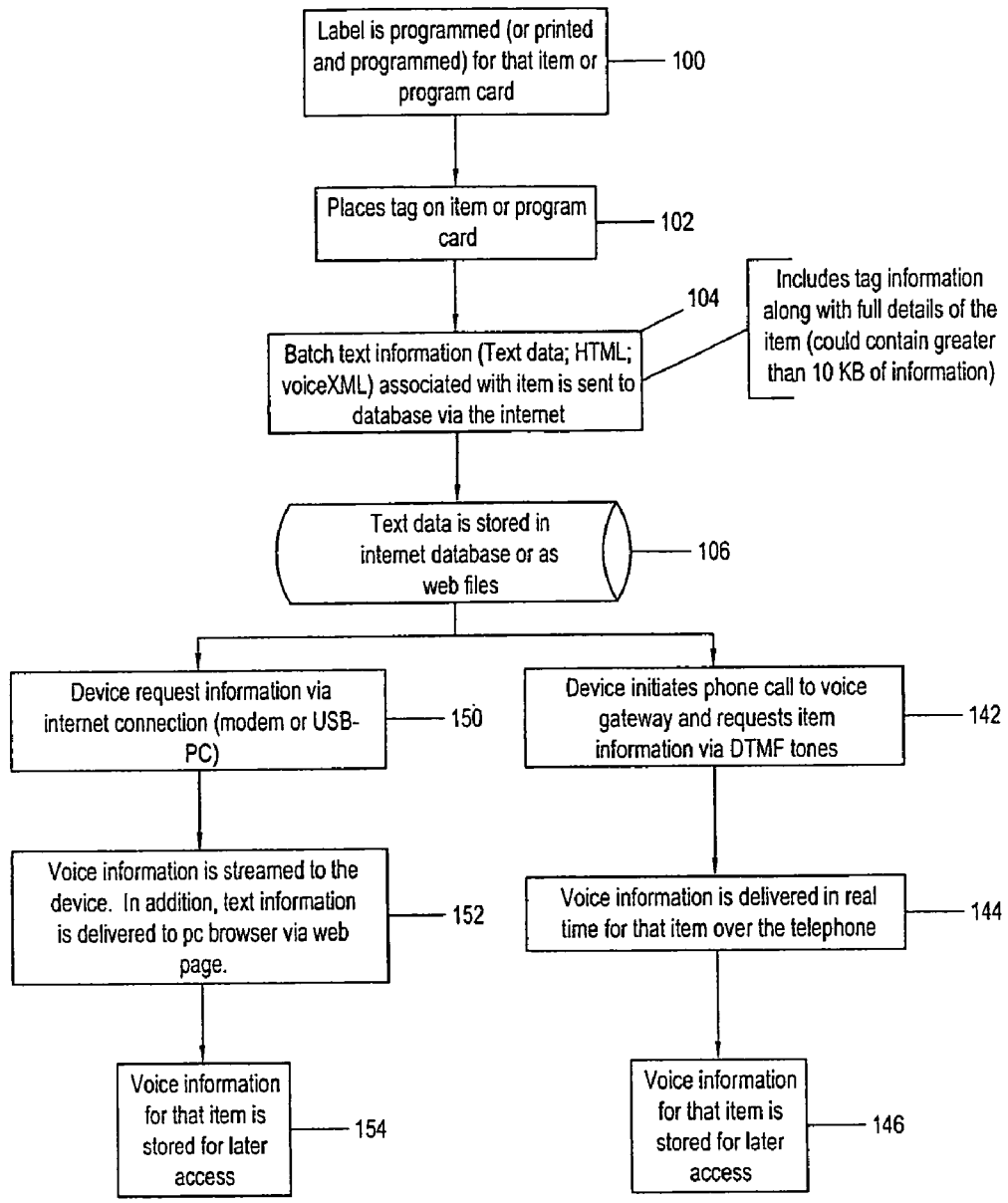
FIG. 8 a flow chart showing the steps for using the system in accordance with a preferred embodiment.

In use, a unique identification code is provided on a label or on a program card, see step 100 in FIG. 8. The unique identification code preferably only includes a minimal amount of information regarding an item to which it is to be attached or associated with. For example, if the unique identification code is to be attached to a prescription, only the Rx number and the telephone number or Internet site information is provided in the unique identification code. If a RFID tag 58 is used, the label is programmed with the unique identification code. If a bar code 60 is used, the unique identification code is printed. The RFID tag 58 or the bar code 60 is then placed on the item, or the program card is provided to the user, step 102.

Non-audible information associated with the unique identification code is sent to the server 26 via the Internet, step 104, and stored on the server 26, step 106. This non-audible information includes specific information about the particular item, for example, label information; product usage information; warnings; reordering information; documentation details; etc. The server 26 may, at the time of receipt of the non-audible information, convert the non-audible information into audible information, for example mp3 files, using the voice server 24. Alternatively, the server 26 may hold the non-audible information until a request for such information is made, and at that time, the non-audible information is converted using the voice server 24 into audible information, for example mp3 files.

Figure 6:
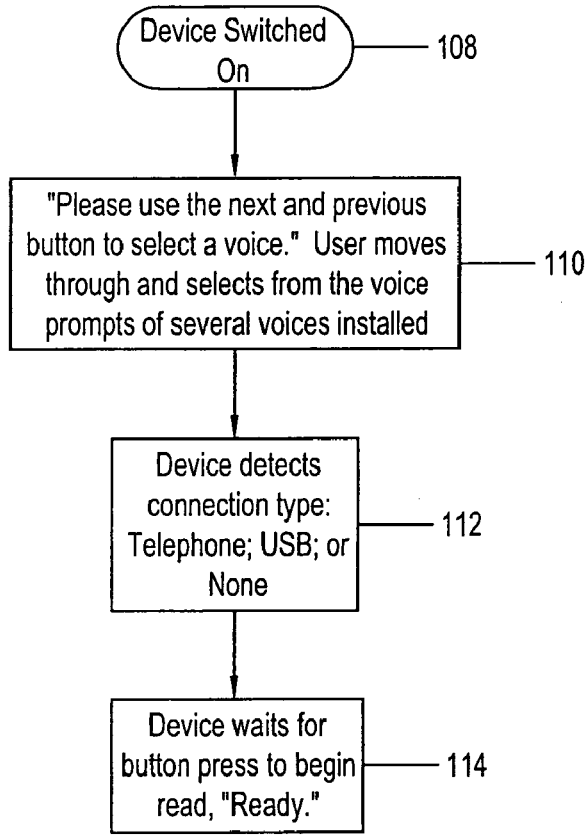
FIG. 6 is a flow chart showing the steps for using the device upon start-up from the factory.
Figure 7:
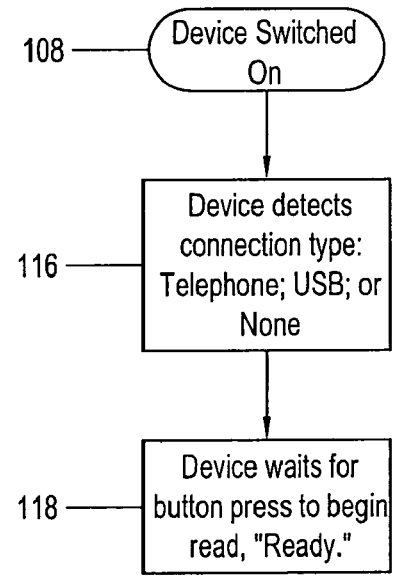
FIG. 7 is a flow chart showing the steps for using the device upon a non-factory start-up.

When a user wants to obtain the information from the server 26, the user, with the device 20 connected either to the telephone or to the Internet, switches the device 20 on by using the on/off switch 36, step 108 in FIGS. 6 and 7. Upon start-up from the factory as shown in FIG. 6, the device 20 requests that the user scroll through the voice prompts for the voices stored in the memory 32, step 110. The user uses the scroll buttons 50, 52 to scroll through the stored voice prompts. The user has control over many aspects of the voice, including, but not limited to, language, the type of voice (male/female), voice speed, and the amount information provided. Next, in step 112, the device 20 detects the type of connection: telephone, USB or none. In step 114, the device 20 then waits for the user to press the start button 48 to begin the scan. Upon a non-factory start-up, as shown in FIG. 7, in step 116, the device 20 detects the type of connection: telephone, USB or none. In step 118, the device 20 then waits for the user to press the start button 48 to begin the scan.

Figure 9:
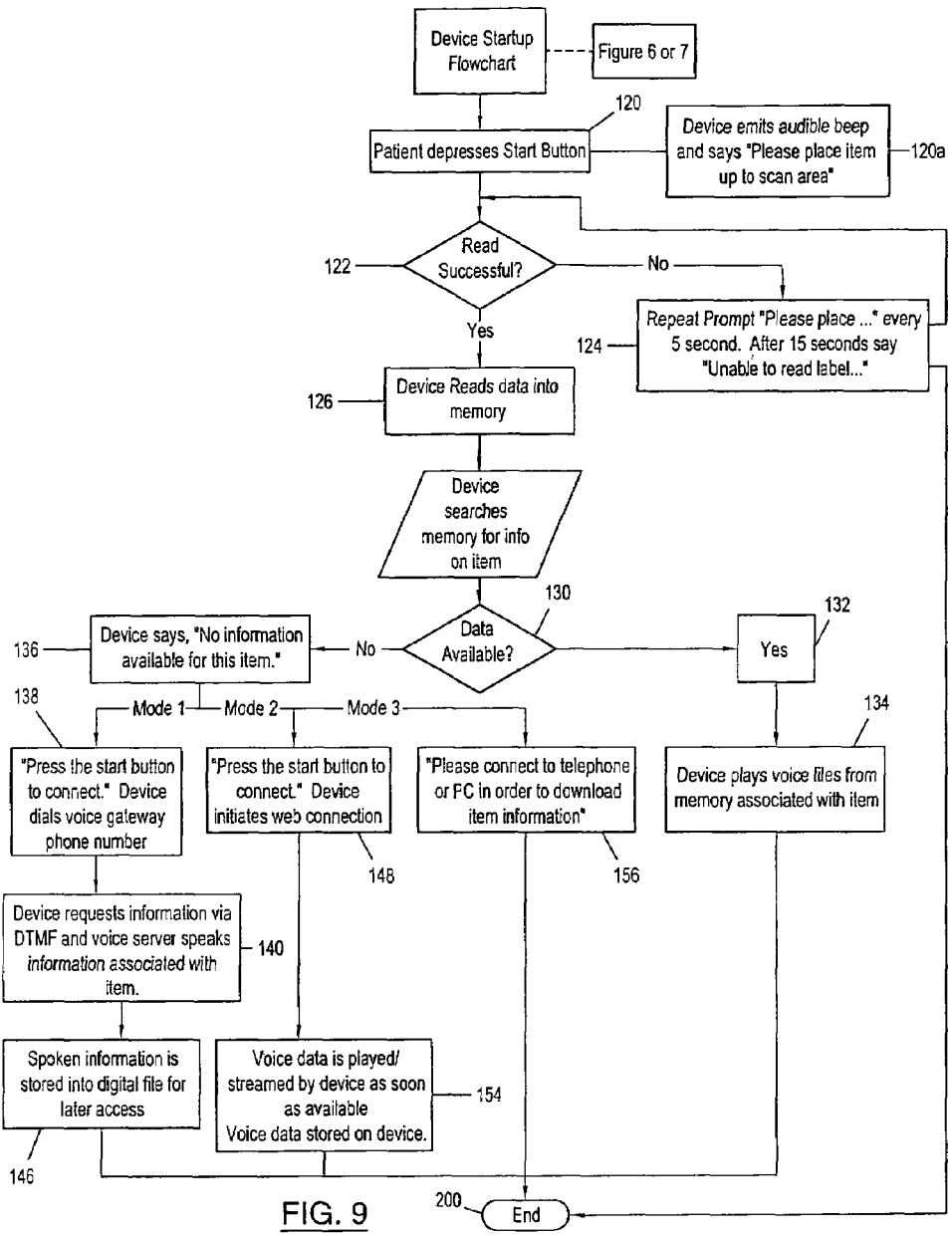
FIG. 9 is a flow chart showing the steps for using the system in accordance with a preferred embodiment.

As shown in FIG. 9, the user depresses the start button 48, step 120. In step 120*a*, the device 20 emits an audible beep and says "Please place item up to scan area". The user then uses the RFID reader/writer 54 or bar code scanner 56 to scan the RFID tag 58, the bar code 60, or the program card and a signal is created. The device 20 determines if the read of the RFID tag 58, the bar code 60, or the program card was successful in step 122.

If the read was not successful, in step 124, the device 20 says "Please place item up to scan area" every 5 seconds. The user then uses the RFID reader/writer 54 or bar code scanner 56 to again scan the RFID tag 58, the bar code 60, or the program card and is returned to step 122. If the user does not repeat the scan within fifteen seconds, the scan is terminated in step 200.

If the read is successful, in step 126, the device 20 reads the signal generated by the scanner 54, 56 into the memory 32. At any point during a scan, the user can depress the start button 48 to stop the scan.

In step 128, the device 20 then searches the memory 32 for data on the item. The device 20 determines at step 130 if data is available.

If data is available in the memory 32 regarding the item, in step 132, the device 30 plays the voice files from the memory 32 associated with the item until completed. At any point during playback, the user can depress the start button 48 to stop playback. Thereafter, the end is reached at step 200.

If data is not available, the device in step 136 states "No information available for the item". The device 20 then enters into one of three modes, depending on the type of connection the device 20 has auto-detected.

Mode 1 is used when a telephone connection is detected by the device 20. The voice server 24 may have touch-tone interactive voice response (IVR) features for use in this mode. In step 138, the device 20 prompts the user to "Press the start button to connect." Once the start button 48 is depressed by the user, the device 20 dials the phone number in step 140 and sends the signal thereto, which requests information from the voice server 24 by using DTMF tones, see step 141 in FIG. 8. The voice server 24 receives the signal and the voice server 24 accesses information in the remote server 26. The voice server 24 speaks the information associated with the item, and/or the information is downloaded to the device 20 for playback by the device 20 to the user, see step 140 in FIG. 9. In FIG. 8, steps 142 and 144 relate to action by the server 26. If the server 26 had at the time of receipt of the non-audible information converted the non-audible information into voice files (store-and-forward voice), the voice files are played. If the non-audible information was held on the server 26, once the request for the information is made, the non-audible information is converted using the voice server 24 into voice files in real-time, and played, and/or downloaded to the device 20 and played, to the user. The spoken information is stored in step 146 in a digital file in the memory 32 of the device 20 for later access. Thereafter, the end is reached at step 200.

Mode 2 is used when an Internet connection is detected by the device 20. In step 148, the device 20 prompts the user to "Press the start button to connect." Once the start button 48 is depressed by the user, the device 20 connects to the Internet and sends the signal thereto, thereby requesting information from the voice server 24, step 148. In FIG. 8, steps 150 and 152 relate to action by the server 26. The server 26 receives the signal from the voice server 24 in step 150. The audible information is streamed to the device 20 via the voice server 24 in step 152. If the server 26 had at the time of receipt of the non-audible information converted the non-audible information into voice files (store-and-forward voice), the voice files are played and/or downloaded to the device 20 for playback by the device 20 to the user. If the non-audible information was held as text files on the server 26, once the request for the information is made, the non-audible information is converted using the voice server 24 into voice files in real-time, and played and/or downloaded to the device 20 for playback by the device 20 to the user. The voice files can be streamed to the user or the non-audible information can be completely converted before playback. The spoken information is downloaded in step 154 into a digital file in the memory 32 of the device 20 for later access. Thereafter, the end is reached at step 200. By requesting a browser web page, the device 20 can deliver a wide variety of multi-media content over a secure connection to an internet browser. A large print webpage can be provided.

Mode 2 utilizes a software resident in the system tray. The software allows the device 20 to send and receive information via the Internet. The software also allows the user to change settings related to internet browser use, for example, whether information is displayed in the browser and the font size.

The server 26 provides for the delivery of information via HTML web server via Internet pages and file download, and via VoiceXML via a telephone. When used with the HTML web server, this allows for the download of voice file (streaming) to the device 20 along with the optional ability to display webpage with formatted content associated with audio files. In the VoiceXML, audio is delivered to the device 20 via VoiceXML gateway.

The device 20 can store the audible information into the memory 32 for continuous access without connecting to the voice server 24 so that user can replay the audible information at will.

Mode 3 is used when the device 20 does not detect a connection. The device 20 in step 156 says "Please connect to the telephone or PC in order to download information". Thereafter, the end is reached at step 200. The user then restarts the procedure to initiate a scan.

The device 20 provides several advantages over the prior art: 1. The device 20 provides for security of information; the device 20 only requires the storage of necessary information. 2. In many cases, the dynamic nature of the information is such that there would be no way to store accurate information related to all unique items. If it were possible to store the information, the safety and integrity of the information would be at risk of decoding and theft. The device 20 delivers only the information required by the user and a full database is not be required to reside in the memory 32. 3. High quality text-to-speech is used. New and more human-like voice text-to-speech generators are being created. More human-like voices allow for users of the device 20 to more clearly understand the information related to the item. This could cut down on mistakes and misinterpretations of the information being spoken. In addition, using a voice server 24 allows for easy enhancements and improvements to voice over time. Centralized control over the pronunciation of words provides a huge improvement over locally generated, static text-to-speech. 4. The device 20 can be economically priced. The device 20 is much less expensive because all text-to-speech generation electronics and software is not be required. If an information-challenged person, such as a visually impaired or illiterate person, uses the device 20, because such an information-challenged person typically has less income potential because of their disability, more information-challenged persons would be able to afford the present device 20. 5. By storing the audible information into the memory 32 of the device 20, a request for information only needs to occur the first time for any item. This gives the user access to audible information when not connected to the server 26.

The device 20 has application in many areas of everyday life for an information-challenged person or other user. Some of those applications are discussed herein, but the applications are not limited to described applications.

The first application is with regard to medications.

A patient requiring audible prescriptions is registered in the pharmacy system and the pharmacy places a unique identification code, either a RFID tag 58 or bar code 60, on the patient's prescription, or provides the patient with a program card. Two basic pieces of information are stored on the RFID tag 58, bar code 60, or program card, 1) the pharmacy voice gateway phone number; and 2) the Rx# or prescription number. The pharmacy sends associated non-audible information relating to that prescription to the server 26. Non-audible information is added to the server 26 and waits for the patient's telephone or Internet request.

In the telephone method, the patient scans the RFID tag 58, bar code 60, or program card and the device 20 dials into the voice server 24 using a specially-equipped analog telephone (RFID-based playback device). Using DTMF or comparable methods, the device 20 sends a request for information about the particular prescription to the voice server 24. Audible information about the prescription is immediately played by the voice server 24 over the telephone. Audible information can be stored by the device 20 for later access without dialing in. The telephone allows the user to move through the audible information about the prescription, including detailed information related to the medication. The patient is also able to change the language, speed and pitch of the voice.

In the Internet method, the patient connects to the Internet by an wired or wireless internet protocol connection. After the user scans the RFID tag 58, bar code 60, or program card, the device 20 sends a request for audible information for the medication to the voice server 24. Audible information is streamed to the device 20 and playback begins immediately. The audible information can be stored into the memory 32 for later access.

The device 20 provides several benefits with regard to medications. It is a pharmacy-delivered system. It is an inexpensive Internet and telephone based system which allows for the largest number of potential users. The device 20 can be easily migrated to global system for mobile communications (GSM), code-division multiple access (CDMA) or voice over internet protocol (VOIP). High quality text-to-speech can be used which provides for ease of enhancements and improvements to the voice over time. In addition, as a result of using high quality text-to-speech, there is centralized control over dictionary and pronunciations. The pharmacy has a low acquisition cost as inexpensive consumables, bar codes or RFID tags and reader/writer are the only items required. There is scalability.

The next application is with regard to sign accessibility.

The American with Disability Act (the ADA) provides specific rules for sign accessibility. Signs that identify permanent rooms and spaces must have raised, tactile letters and numbers, and be translated into Grade 2 Braille. The Department of Justice particularly mentions numbered rooms, restrooms and exits as requiring tactile signs. Although there are currently no rules with regard to audible signage inside public or private buildings, voice would be an easier way for information-challenged persons to get the signage information.

In this application, a sign contractor places a RFID tag 58 or a bar code 60 onto a sign. The RFID tag 58 or the bar code 60 may be raised and tactile so those with a vision impairment can located the RFID tag 58 or the bar code 60 on the sign. The sign company sends non-audible information to the server 26. The server 26 awaits a user's request for the sign data.

Upon entering the building, the user scans the sign with the device 20. The device 20 initiates a telephone call to the voice server 24. In real-time, audible information is played over the device 20 to the user about that location.

Another application is with regard to bills for services, such as utilities or credit cards.

A company affixes the RFID tag 58 or the bar code 60 onto a bill or invoice for a user. The non-audible information relating to the bill or invoice is sent to the server 26. Using the device 20, the person can have the bill information spoken in real-time.

Yet a further application is for service professionals in the field.

A product has the RFID tag 58 or the bar code 60 affixed thereto. The non-audible information is sent to the server 26. Using the device 20, a mobile service person can have information spoken in real-time regarding the product.

While preferred embodiments of the present invention are shown and described, it is envisioned that those skilled in the art may devise various modifications of the present invention without departing from the spirit and scope of the appended claims.

The invention claimed is:

1. A system comprising:
   a voice server;
   a device for providing audible information to a user regarding an item, said device including a scanner for scanning a unique identification code associated with the item and for providing a corresponding signal, means for transmitting said signal to said voice server, said voice server capable of transmitting audible information associated with said signal, means for receiving the audible information from said voice server, and means coupled to said receiving means for playing the received audible information to the user;
   a remote server containing non-audible information relating to the item, said voice server and said remote server capable of being connected to each other; and
   means for converting said non-audible information to audible information.

2. A system as defined in claim 1, wherein said unique identification code is provided in a bar code.

3. A system as defined in claim 1, wherein said unique identification code is provided in a RFID tag.

4. A system as defined in claim 1, wherein said device is one of a PDA, telephone or personal computer.

5. A system as defined in claim 1, wherein said device further includes a memory for storing said audible information.

6. A device as defined in claim 5, wherein said device is one of a PDA, telephone or personal computer.

7. A system as defined in claim 1, wherein said non-audible information is one of textual information stored on said remote server, a static HTML file stored on said remote server or a voice XML page stored on said remote server.

8. A system as defined in claim 1, wherein said means for converting said non-audible information to audible information is a text-to-speech converter.

9. A system as defined in claim 8, wherein said device further includes a memory for storing said audible information.

10. A system as defined in claim 9, wherein said device is one of a PDA, telephone or personal computer.

11. A system as defined in claim 8, wherein said text-to-speech converter is located in said voice server.

12. A system as defined in claim 11, wherein said non-audible information is one of textual information stored on said remote server, a static HTML file stored on said remote server or a voice XML page stored on said remote server.

13. A method of providing audible information to a user regarding an item, said method comprising:
   scanning a unique identification code associated with the item to read the unique identification code;
   sending a signal relating to the unique identification code to a voice server capable of transmitting audible information associated with said signal;
   sending non-audible information to a remote server relating to the item;
   converting said non-audible information to said audible information;
   receiving the audible information from the voice server;
   accessing said audible information after said unique identification code is scanned; and playing the audible information.

14. A method as defined in claim 13, wherein said voice server is accessed by a telephone connection.

15. A method as defined in claim 14, wherein said audible information is stored.

16. A method as defined in claim 14, wherein said audible information is played and stored.

17. A method as defined in claim 13, wherein said voice server is accessed by an Internet connection.

18. A method as defined in claim 17, wherein said audible information is streamed to the user.

19. A method as defined in claim 17, wherein said audible information is streamed to the user and stored.

20. A method as defined in claim 13, wherein said audible information is streamed to the user.

21. A method as defined in claim 13, wherein said non-audible information is converted to audible information by using a text-to-speech converter.

22. A method of providing audible information to a user regarding an item, said method comprising:
- scanning a unique identification code associated with the item to read the unique identification code;
- sending a signal relating to the unique identification code to a voice server capable of transmitting audible information associated with said signal;
- sending non-audible information to a remote server relating to the item;
- accessing said remote server after said unique identification code is scanned;
- converting said non-audible information to said audible information after said remote server is accessed:
- receiving the audible information from the voice server; and
- playing the audible information.

23. A method as defined in claim 22, wherein said audible information is streamed to the user.

24. A method as defined in claim 22, wherein said non-audible information is converted to audible information by using a text-to-speech converter.

25. A method as defined in claim 24, wherein said voice server is accessed by a telephone connection.

26. A method as defined in claim 25, wherein said audible information is stored.

27. A method as defined in claim 25, wherein said audible information is played and stored.

28. A method as defined in claim 24, wherein said voice server is accessed by an Internet connection.

29. A method as defined in claim 28, wherein said audible information is streamed to the user.

30. A method as defined in claim 28, wherein said audible information is streamed to the user and stored.

* * * * *